US012808698B2

(12) United States Patent
Ji

(10) Patent No.: US 12,808,698 B2
(45) Date of Patent: Nov. 24, 2026

(54) AUTOMATIC FIBER LOSS DETECTION USING COHERENT OTDR

(71) Applicant: NEC CORPORATION, Princeton, NJ (US)

(72) Inventor: Philip Ji, Cranbury, NJ (US)

(73) Assignee: NEC CORPORATION, Toyko (JP)

(*) Notice: Subject to any disclaimer, the term of this patent is extended or adjusted under 35 U.S.C. 154(b) by 564 days.

(21) Appl. No.: 18/319,475

(22) Filed: May 17, 2023

(65) Prior Publication Data

US 2023/0375377 A1 Nov. 23, 2023

Related U.S. Application Data

(60) Provisional application No. 63/343,719, filed on May 19, 2022, provisional application No. 63/343,713, filed on May 19, 2022.

(51) Int. Cl.
*G01D 5/353* (2006.01)
*G01H 9/00* (2006.01)
*G01M 11/00* (2006.01)

(52) U.S. Cl.
CPC ......... *G01D 5/35358* (2013.01); *G01H 9/004* (2013.01); *G01M 11/3109* (2013.01)

(58) Field of Classification Search
CPC ...... G01D 5/35358; G01D 3/08; G01H 9/004; G01M 11/3109; G01M 11/3145
See application file for complete search history.

(56) References Cited

U.S. PATENT DOCUMENTS

| | | | | |
|---|---|---|---|---|
| 2007/0025681 | A1* | 2/2007 | Turner | G02B 6/25 385/147 |
| 2011/0249969 | A1* | 10/2011 | Ji | H04B 10/60 398/208 |
| 2017/0211970 | A1* | 7/2017 | Milione | G01H 9/004 |
| 2017/0310390 | A1* | 10/2017 | Shiner | H04B 10/0775 |
| 2020/0003612 | A1* | 1/2020 | Hu | G01H 9/004 |
| 2020/0005036 | A1* | 1/2020 | Ji | G06T 5/70 |
| 2020/0116556 | A1* | 4/2020 | Cedilnik | G01L 1/242 |
| 2020/0225079 | A1* | 7/2020 | Cedilnik | G01M 11/3109 |
| 2023/0366726 | A1* | 11/2023 | Han | G01H 9/004 |

FOREIGN PATENT DOCUMENTS

| | | | | |
|---|---|---|---|---|
| CN | 117828282 A | * | 4/2024 | G06N 20/20 |
| CN | 121702530 A | * | 3/2026 | |
| WO | WO-2016207776 A1 | * | 12/2016 | G01D 5/35361 |

* cited by examiner

*Primary Examiner* — Michelle M Iacoletti
*Assistant Examiner* — Maher Yazback
(74) *Attorney, Agent, or Firm* — Sughrue Mion, PLLC

(57) ABSTRACT

Computer vision based, wide-area snow/water level estimation methods using disparity maps. In one embodiment our method provides rich depth-information using a stereo camera and image processing. Scene images at normal and snow/rain weather conditions are obtained by a double-lens stereo camera and a disparity map is generated from the scene images at left and right lenses using a self-supervised deep convolutional network. In another embodiment, our method uses a single point snow/water level sensor, a stationary monocular camera to measure snow/water levels covering a wide area.

10 Claims, 9 Drawing Sheets

| Scheme | **Conventional OTDR** prior art | **Standard C-OTDR** prior art | **C-OTDR with fiber end detection function** prior art | **C-OTDR with loss detection function and fiber end detection function** current disclosure |
|---|---|---|---|---|
| Hardware | Conventional OTDR | C-OTDR | C-OTDR | C-OTDR |
| Can obtain fiber end point information? | Yes | No, unless adding additional hardware and controller | Yes | Yes |
| Can produce filer attenuation profile? | Yes | No, unless adding additional hardware and controller | No | Yes |
| Sensitive to vibration? | No | Yes | During fiber end detection: no; During vibration sensing: Yes | During loss detection and fiber end detection: no; During vibration sensing: Yes |
| Optical source | Broadband | Narrow band | Narrow band | Narrow band |
| Can perform vibration sensing? | No | Yes | Yes, after change the signal processing parameters/settings (easy and fast action, no need any hardware change) | Yes, after change the signal processing parameters/settings (easy and fast action, no need any hardware change) |
| Achievable function without hardware change | Attenuation and end point location | Vibration sensing | Both vibration sensing and end point location | Vibration sensing, end point location, and loss detection |

*FIG. 9*

AUTOMATIC FIBER LOSS DETECTION USING COHERENT OTDR

CROSS-REFERENCE TO RELATED APPLICATIONS

This application claims the benefit of U.S. Provisional Patent Aapplication Ser. No. 63/343,719 filed May 19, 2022, the entire contents of which is incorporated by reference as if set forth at length herein.

FIELD OF THE INVENTION

This application relates generally to fiber optic communications test and measurement systems and methods. More particularly, it pertains to fiber optic loss detection using coherent optical time division reflectometry (C-OTDR).

BACKGROUND OF THE INVENTION

Optical time domain reflectometry is a technique widely used to test the integrity of optical fibers used in fiber optic telecommunications facilities. OTDR can measure the static condition of the fiber, such as the fiber end point, high loss point, and attenuation profile. It can also monitor changes in fiber condition, such as loss variation or that resulting from a fiber cut. Given its importance, improved OTDR techniques would be a welcome addition to the art.

SUMMARY OF THE INVENTION

An advance in the art is made according to aspects of the present disclosure directed to fiber optic loss detection using coherent optical time division reflectometry (C-OTDR).

Viewed from one aspect, our inventive system and method according to aspects of the present disclosure that employs only C-OTDR to perform fiber loss detection—while still maintaining vibration/acoustic signal sensing function and the end point detection function—and automatically identify and localize any large loss event without manual inspection. Our inventive scheme also bypasses a high-pass-filtering stage when calculating the intensity change in the C-OTDR and uses the power profile for analysis. Additionally, our inventive method minimizes the noise at the power profile data in the fiber section. Advantageously, by monitoring the variation in the de-noised power profile, the fiber loss event can be detected and localized automatically.

In sharp contrast to the prior art, our system and method according to aspects of the present disclosure: 1) uses a DSP scheme to generate the power profile along the sensing range; 2) de-noises the power profile data; 3) monitors the variation in the de-noised power profile; uses the de-noise parameter to calculate the event location if a loss variation is observed; and 4) uses this scheme to monitor fiber loss event continuously.

BRIEF DESCRIPTION OF THE DRAWING

FIG. 9 is a comparison of various schemes comparing the operations of the present disclosure with other known methods according to aspects of the present disclosure.

DETAILED DESCRIPTION OF THE INVENTION

Figure 1:
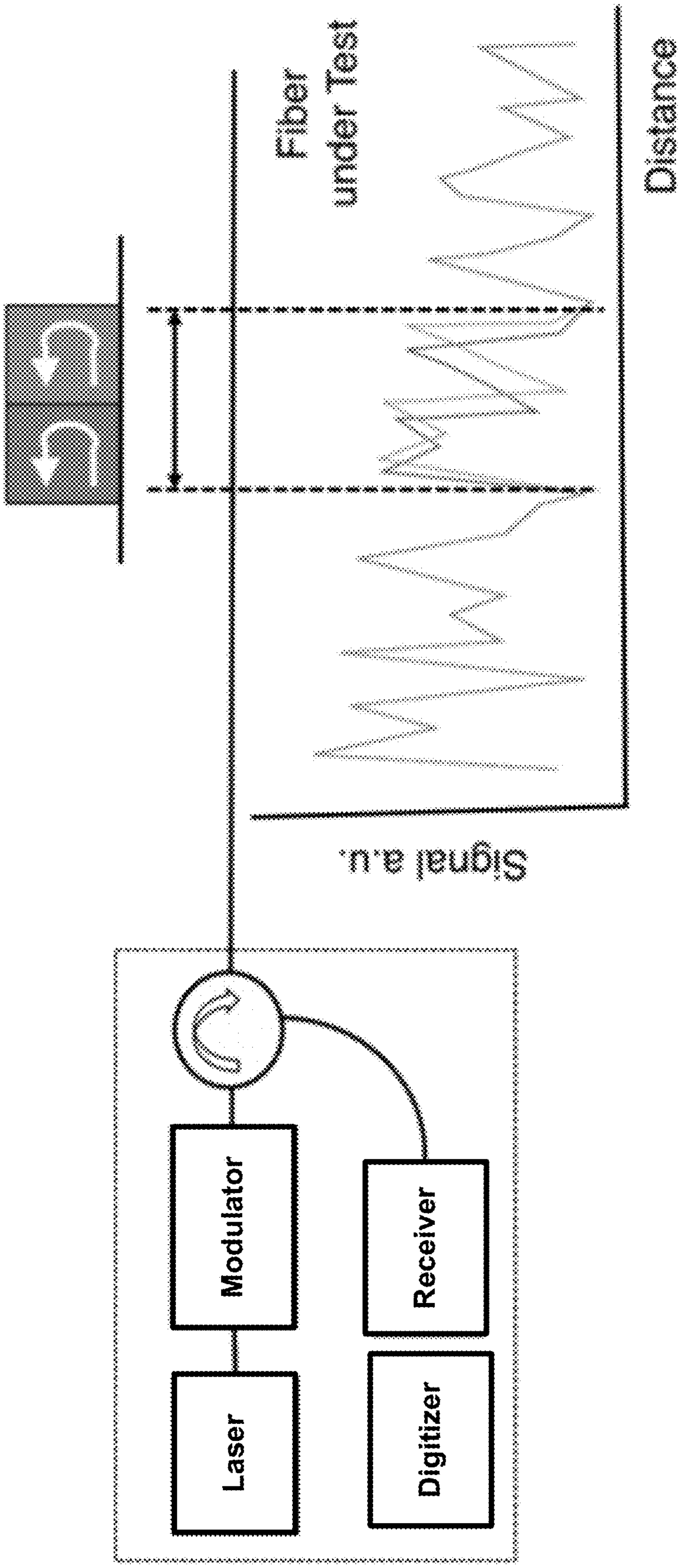
FIG. 1 is a schematic diagram showing an illustrative OTDR arrangement according to aspects of the present disclosure.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGURES comprising the drawing are not drawn to scale.

By way of some further background, we note that OTDR (Optical time domain reflectometer) is a common technique used in fiber optic systems to test the integrity of the optical fibers. It can measure the static condition of the fiber, such as the fiber end point, high loss point, and the attenuation profile. It also can monitor the changes in the fiber condition, such as fiber cut or loss variation.

FIG. 1 is a schematic diagram showing an illustrative OTDR arrangement according to aspects of the present disclosure;

OTDR is based on Rayleigh backscattering and uses reflectometry technique to monitor the entire fiber with fine spatial resolution. Because the optical source used in the conventional OTDR (such as laser with broad linewidth or LED) is essentially incoherent, conventional OTDR is not sensitive to vibration in the fiber.

It is worth noting that there is another type of instrument that is also based on Rayleigh backscattering. However, it uses narrow linewidth laser, which has a very long coherent length (tens or hundreds of kilometers, or even longer), therefore it is sensitive to the micro fiber elongation and the micro refractive index change caused by vibration, and thus can detect vibrations along the fiber, from low frequency mechanical movement to high frequency acoustic or ultrasound signal. This type of sensor is usually called distributed vibration sensor (DVS) or distributed acoustic sensor (DAS) based on its functionality. They are also called coherent OTDR (C-OTDR) or phase-sensitive OTDR ($\phi$-OTDR) based on its operation principle. In the rest of this document, the terms C-OTDR, $\phi$-OTDR, DVS, and DAS are used interchangeably, even though each term has different emphasis, either on the principle or the function.

DAS/DVS is a type of distributed fiber optic sensor (DFOS), which is capable of sensing various physical phenomena (such as temperature, vibration, strain, etc.) over a long distance of optical fiber (tens of kilometers, or ever a hundred kilometers) with fine spatial resolution. Each DFOS system sensor fiber effectively acts as thousands of sensors along the length of the sensor fiber. Therefore, it has many useful applications, such as traffic monitoring along the highway, temperature monitoring on electric cable, earthquake monitoring, civil infrastructure health monitoring, perimeter intrusion detection, etc.

Even though C-OTDR provides high sensitivity detection of vibration or acoustic signals, it is not effective in measuring fiber cut location or a fiber end point, no matter if the analysis is based on relative phase change or optical signal intensity change. By bypassing the high-pass-filtering stage when calculating the intensity change and by data processing, the fiber end point can be identified automatically. However, this scheme cannot be used to allow C-OTDR monitor fiber loss variation effectively, which is an important function of conventional OTDR.

In conventional OTDR, the optical attenuation profile along the fiber is measured. When there is a change in the attenuation profile, such as an increase of loss at some location, anomaly can be reported, and actions can be taken. FIG. 1 shows the example of an increase loss in the middle of the fiber, which is observed by conventional OTDR.

In standard C-OTDR operation, the output is a vibration signal, and does not indicate the power profile information. By using one particular scheme, the power profile can be obtained, however it is very noisy.

Figure 2:
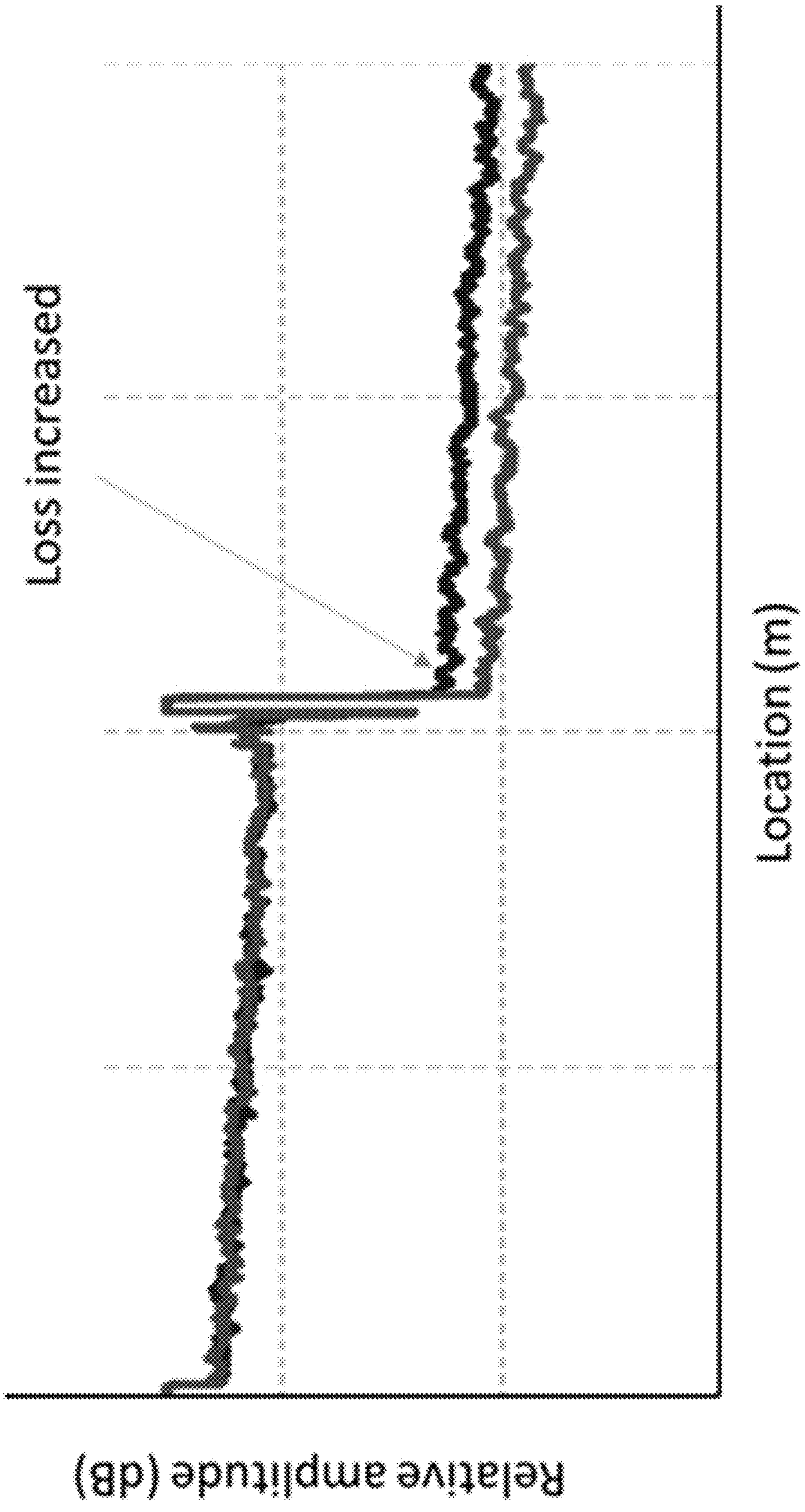
FIG. 2. is a plot showing an illustrative example of loss variation measured by conventional OTDR and a new attenuation profile after large loss occurred according to aspects of the present disclosure.

FIG. 2. is a plot showing an illustrative example of loss variation measured by conventional OTDR and a new attenuation profile after large loss occurred according to aspects of the present disclosure.

FIG. 2 shows an example. This measured data plot shows the power profile curves before (green) and after (red) the large loss event. As expected, the fiber end point (at ~2600 m) can be clearly identified. However, even though visually it's also possible to see that there is a drop of power at the location of ~1950 m, it is difficult for the instrument to identify it automatically due to large noise in the power profile. For example, in the section before the large loss point (i.e. before 1950 m), the power profile value between the one curve and the other curve does not have a consistent relationship (they are supposed to be the same). In any particular location, the value of the one curve can be several times higher than the other curve or can also be several times lower. And in the section after the large loss occurs, the value of the one curve is actually lower than the value of the other curve at some locations. Therefore, it is not possible to directly compare the values between these two curves to monitor if a large loss event occurs.

There is a strong demand to monitor the loss along the fiber while doing vibration sensing in many DFOS applications. For example, an improper operation near or on the fiber optic cable might cause fiber damage, which leads to a large loss. By monitoring the vibration and monitoring the loss concurrently and analyzing both types of data, the event and the cause can be identified easily and promptly, because the damage worsens and the fiber gets cut. Therefore it is important to find a solution to automatically monitor fiber loss, besides identify the fiber end point, on the C-OTDR.

The most straightforward way is to combine a C-OTDR with a conventional OTDR, which has the capability of showing the fiber end point location and monitoring loss. However, it is not economical.

An improvement is to set up two types of light sources in the system (broader band light source for traditional OTDR function, and narrow linewidth light source for C-OTDR function) and share the rest of the optoelectronic components. This is more economical than having two systems in parallel, however it still requires two light sources (usually lasers), and electronic circuitry to switch between them to perform different functions.

There are other techniques to improve that, such as sweeping the laser wavelength and collect the data multiple times under different wavelengths to calculate the averaged signal, or use an optoelectronic scrambler to scramble the signal multiple times and then collect the data to calculate the averaged signal. These schemes require multiple measurements each time, therefore is not time efficient. They also require additional hardware components (such as tunable laser and scrambler, with respective control circuitry), which adds to the system cost, size, and control complexity.

Furthermore, these methods still rely on human visual analysis to find the loss and determine the location and cannot provide an automatic end point detection scheme.

According to the present disclosure, we describe a scheme to use only the C-OTDR hardware to perform fiber loss detection (while still maintaining the same vibration/acoustic signal sensing function and the end point detection function), and the scheme can automatically identify and localize any large loss event without manual inspection. Therefore, it does not require additional cost, and can save human operation expense.

Similar to a fiber end point detection scheme, the scheme also bypasses the high-pass-filtering stage when calculating the intensity change in the C-OTDR and use the power profile for analysis. It further adds processing steps to minimize the noise at the power profile data in the section with fiber. By monitoring the variation in the de-noised power profile, the fiber loss event can be detected and localized automatically.

Figure 3:
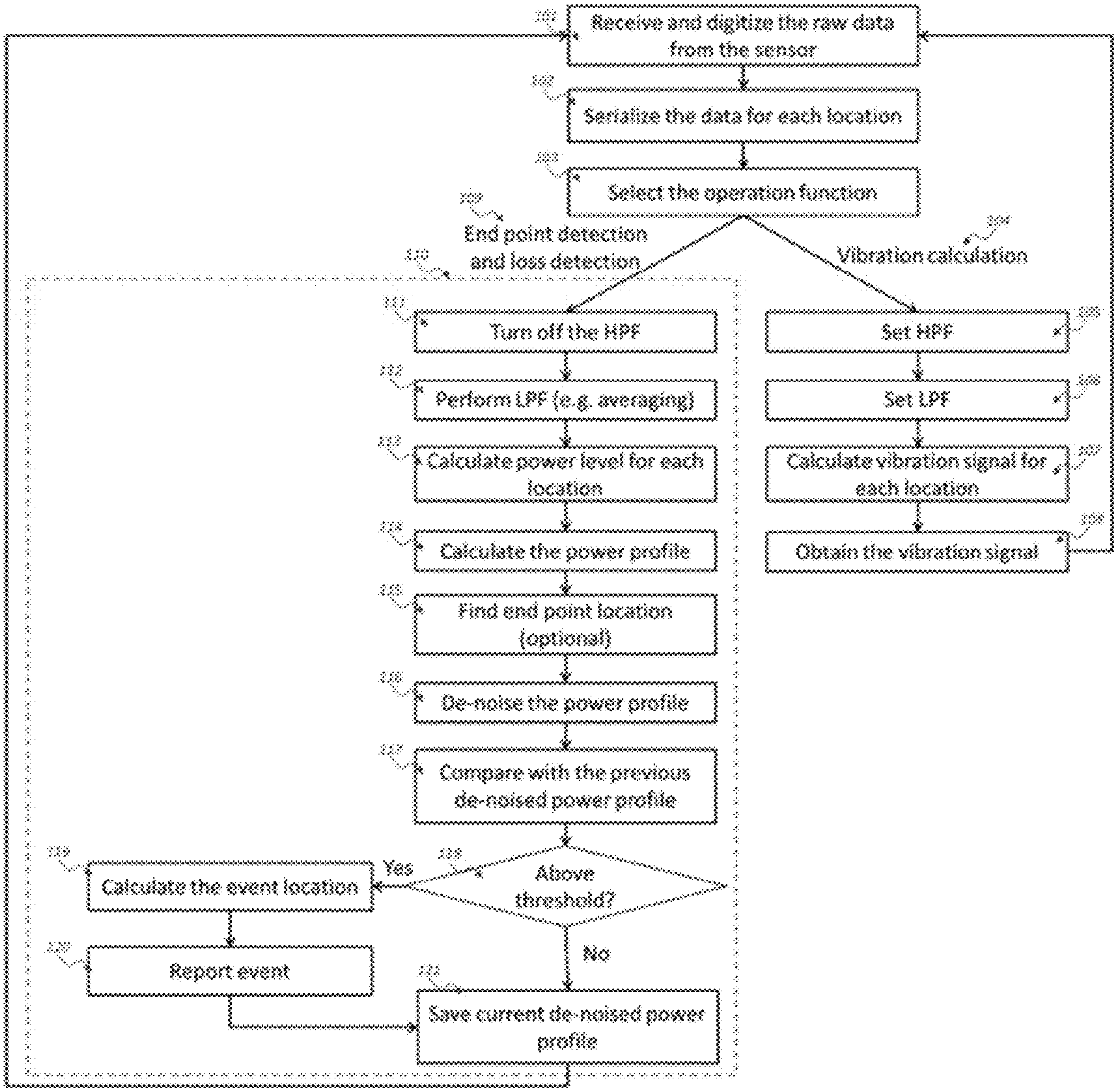
FIG. 3 is a schematic flow diagram showing our inventive method according to aspects of the present disclosure.

FIG. 3 is a schematic flow diagram showing our inventive method according to aspects of the present disclosure. As shown in this block flow diagram, is our method to detect fiber loss using C-OTDR. The section in the dashed box are the main steps. The overall flow chart shows the operation of the entire fiber optic sensor system, including the regular vibration detection operation and fiber end point identification function.

With reference to that FIG. 3, we note that in the operation of a C-OTDR sensor, optical pulses from a laser source are transmitted down the sensing fiber (fiber under test) periodically. The Rayleigh backscattering signal generated from each pulse at each location on the fiber is received by the optical receiver when it returns to the sensor (also called the interrogator). These signals are then digitized and for DSP (digital signal processing) purpose. These are the raw data from the sensor [101]. For each location on the fiber, the raw data of the received Rayleigh backscattering signals from the periodic pulses are then serialized individually into separate time series [102]. The subsequent steps of processing are performed on each time series of data, each one of them corresponds to one location on the sensing fiber, as shown in the figure.

In regular C-OTDR, the subsequent steps are to perform vibration calculation to obtain the vibration information on the fiber, which includes the steps such as setting a high pass filter (HPF) to remove the baseband noise near the DC [105], then setting a low past filter (LPF) to remove the high frequency noise and aliasing [106], then use the filtered data to calculate the vibration signal for each location [107], and then combine the vibration signals from all locations to produce the vibration information for the entire sensing fiber [108]. In some alternative implementations, the HPF and LPF are replaced with an equivalent bandpass filter (BPF) to remove the DC offset and the high frequency noise.

For the new function of monitoring the fiber loss (as well as detecting the fiber end), the serialized data are processed differently. Firstly, the DSP (which could be the FPGA firmware or software on a computer) will decide which function to take [103], based on the required function at that time. If the vibration calculation function is selected [104], the data will go through the same processing as above [105-108], but if the loss detection and/or the end point detection function is selected [109], different processing steps will be taken, as shown in the blue dashed box [110].

In the loss detection and/or end point detection operation, the first step is to turn off (or bypass) the HPF function of the vibration calculation processing [111]. An example of the HPF function is to use an IIR digital filter to obtain the DC signal, which is then subtracted from the input signal. Even though the baseband (low frequency) noise from the opto-electronic hardware will remain, it is acceptable for the function of end point detection. The subsequent LPF steps, such as performing averaging, is not changed [112]. In the BPF case, the bandpass filter will be reconfigured to keep the DC offset at this step.

From the filtered signal, the optical power of each location can be calculated [113]. The calculation process is similar to the vibration calculation step 107, however the result does not only contain the vibration signal, but also the low frequency noise. The calculated optical power from all locations are combined to produce the power profile for the entire sensing fiber [114].

Figure 4:
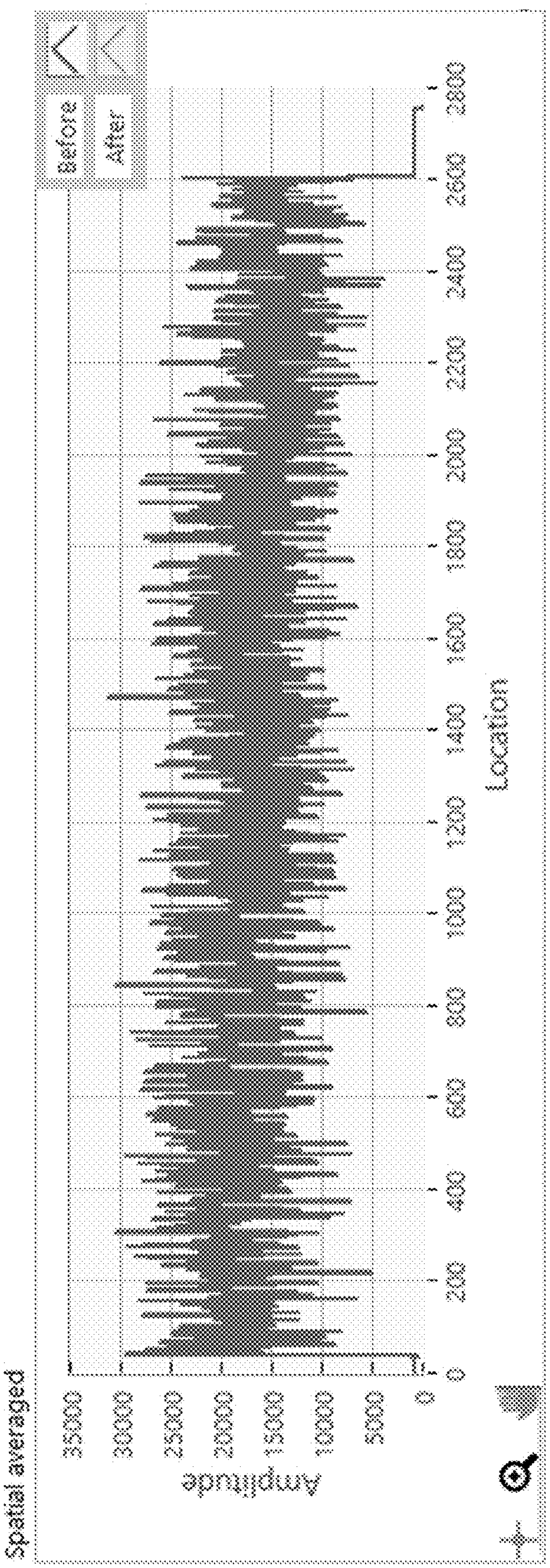
FIG. 4 is a plot showing an illustrative example of a calculated C-OTDR power profile according to aspects of the present disclosure according to aspects of the present disclosure.

FIG. 4 is a plot showing an illustrative example of a calculated C-OTDR power profile according to aspects of the present disclosure according to aspects of the present disclosure—which is very noisy. It is sufficient for the end point detection purpose however it cannot be used to obtain the fiber attenuation information like in the traditional OTDR.

If fiber end point information is needed, the power profile data is used to calculate the fiber end point [115].

In the next step [116], de-noising is performed on the power profile. The most straightforward way is to perform a moving averaging. Usually moving averaging can be performed on temporal and/or spatial domain. However, since the power profile in a C-OTDR refreshes very quickly (multiple times per second), the signal condition at each location usually does not experience much variation across multiple measurements, therefore performing averaging at the temporal domain is not effective.

Performing moving averaging at the spatial domain is used in this step. An appropriate sample length for the moving averaging is selected. If the sample length is too low, the de-noising performance is poor. If the sample length is too large, some loss variation points might be missed, and the computation time will be longer. However, since it is not common to have multiple loss variation events occurring simultaneously, and since most of the computers have sufficient computation power, it is fine to select a larger sample length.

Figure 5:
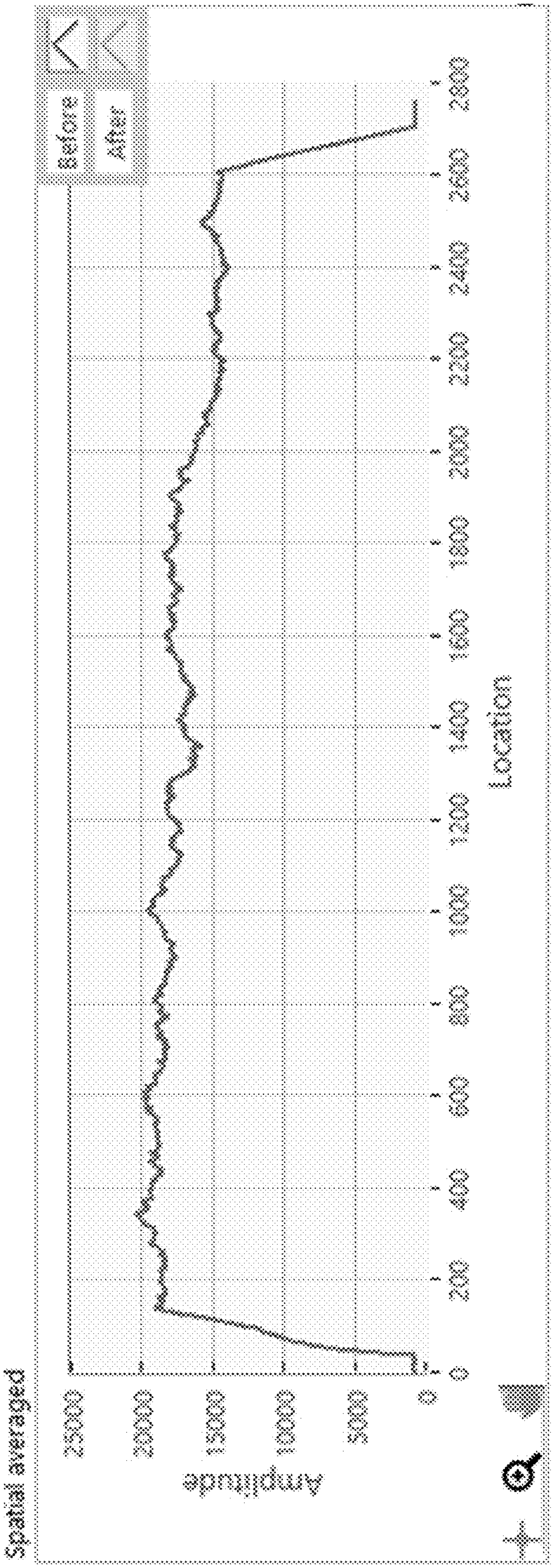
FIG. 5 is a plot showing an illustrative example of a de-noised C-OTDR power profile according to aspects of the present disclosure according to aspects of the present disclosure.

FIG. 5 is a plot showing an illustrative example of a de-noised C-OTDR power profile according to aspects of the present disclosure according to aspects of the present disclosure. In order to monitor the loss event in the fiber, the changes in the de-noised power profile is observed. This is done by comparing the latest de-noised power profile with the previous de-noised power profile [117].

Figure 6:
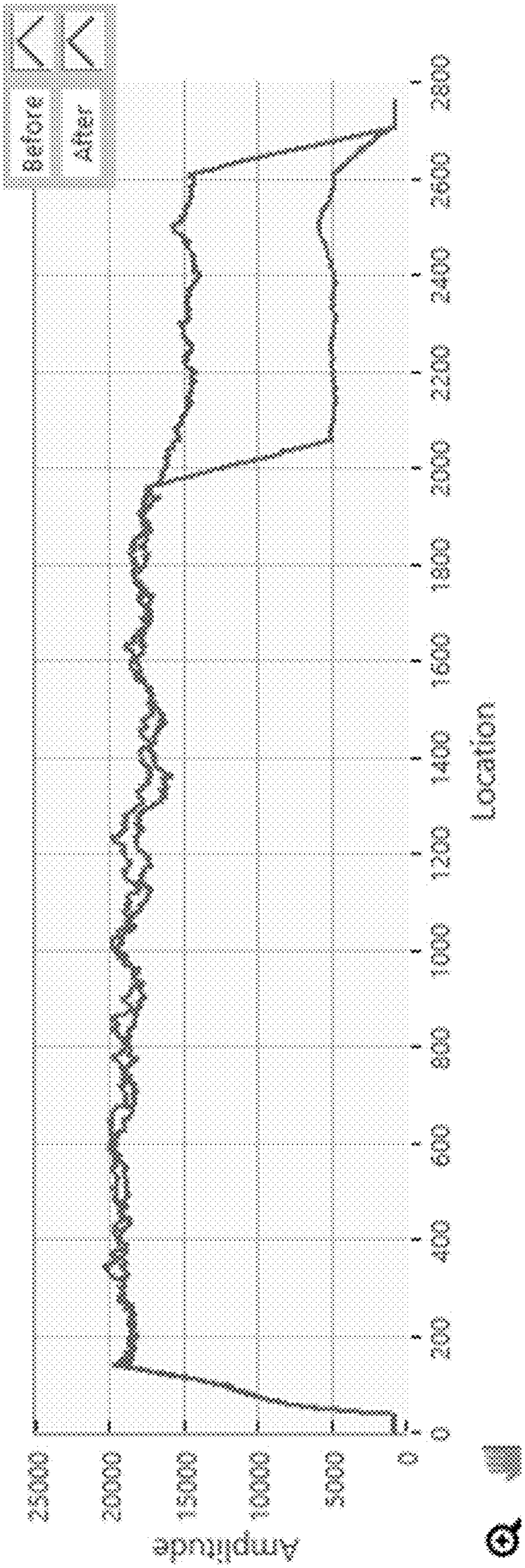
FIG. 6. is a plot showing an illustrative example of the de-noised C-OTDR power profiles before and after a loss event according to aspects of the present disclosure.

FIG. 6. is a plot showing an illustrative example of the de-noised C-OTDR power profiles before and after a loss event according to aspects of the present disclosure—from the example in FIG. 2. Same as in that earlier figure, here the curves are the "before loss event" result and "after loss event" result respectively. Compared with the original power profile data in FIG. 2, the de-noised power profile at the section before the loss event location is very close, and the difference between the two curves after the loss event location is very obvious.

To make it easier to observe and analyze the loss variation, the ratio between the "before loss event" data and the "after loss event" data is obtained for every location using the de-noised power profiles.

Figure 7:
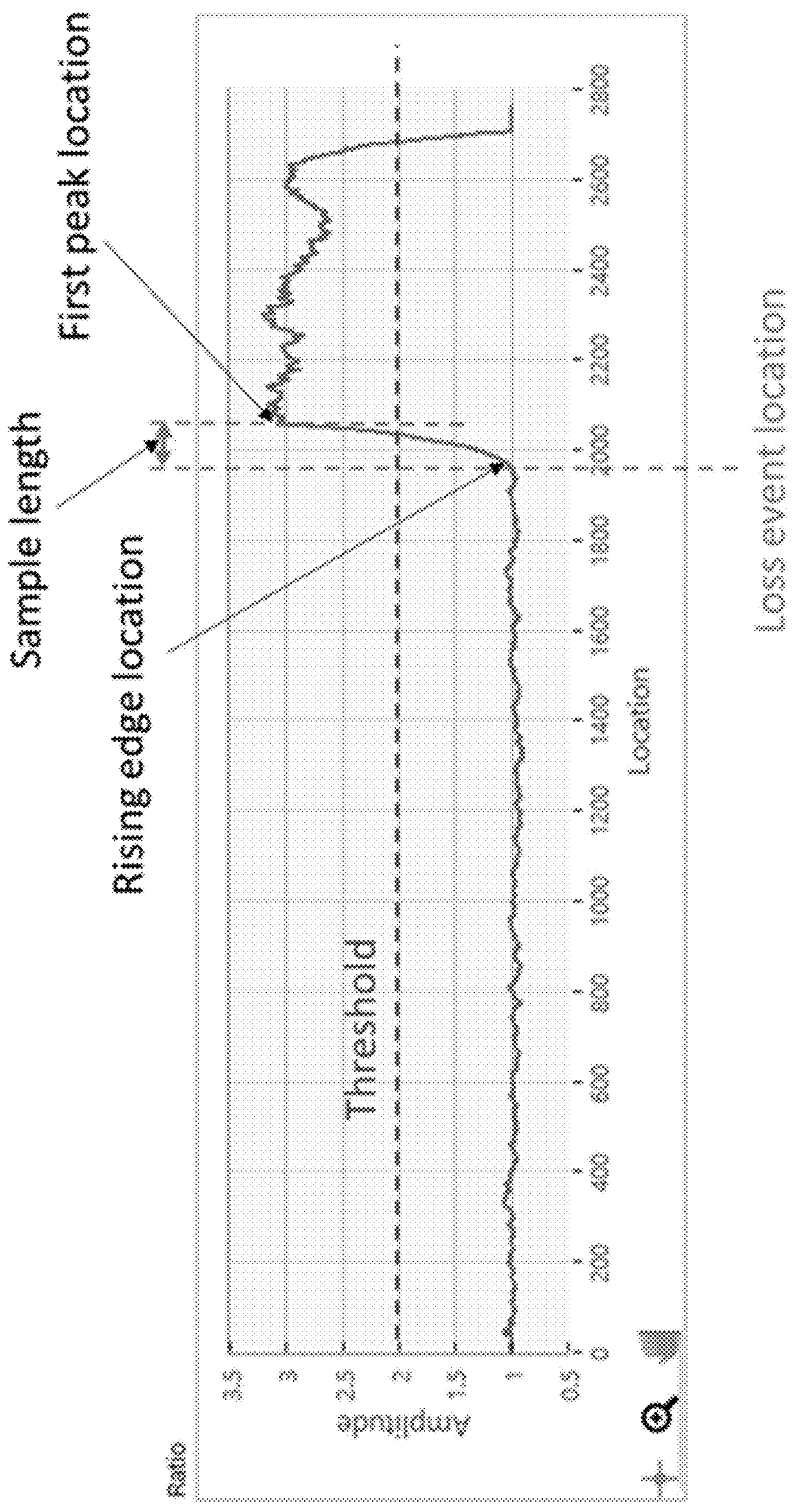
FIG. 7 is a plot showing an illustrative example of the ratio between the de-noised C-OTDR power profiles before and after a loss event according to aspects of the present disclosure.

FIG. 7 is a plot showing an illustrative example of the ratio between the de-noised C-OTDR power profiles before and after a loss event according to aspects of the present disclosure for the plot of FIG. 6. As expected, the ratio of the section before the loss event location is around 1, and the ratio of the section after the loss event location is high (about 3 times in this example).

With this result, it is very easy to check if there is a large loss event. It can be done by comparing the calculated ratio with a certain pre-set threshold (such as 3 dB or two times) [118]. If the ratio is above the threshold, a large loss event is detected. The event location can then be calculated [119]. Multiple methods can be used to calculate the event location. One method is to use the starting point of the rising edge, which indicates the fiber loss location, as shown in FIG. 7. Another way is to find the first peak location, and then subtract the distance related to the averaging sample length, which is also shown in FIG. 7. These methods can be easily performed by simple data processing, therefore automatically event location calculation can be achieved by regular computer quickly. With the event location identified, alert notification can be sent to the operator automatically [120].

After this step, the latest de-noised power profile data is saved in the memory to be used to compare with the next round of de-noised power profile [121].

If the comparison [118] shows that the ratio curve does not go above the threshold, it means that no large loss event is detected, and the loss event location identification step is not required. The latest de-noised power profile data is directly saved in the memory to be used to compare with the next round of de-noised power profile [121]. And the process goes back to step [101] to obtain the next round of the data from the sensor.

This process is fast, because it only requires one set of raw data from the C-OTDR, which is usually a fraction of a second. The de-noising process, power profile comparison process, and the large loss event location calculation process are simple and straightforward, they do not require complex analysis such as machine learning. All of them can be done within a fraction of a second using standard computer with regular computation power. Therefore, the entire process takes less than a second to complete, and the fiber end point (or fiber cut point) detection function is also completed at the same time. Comparatively, conventional OTDR usually takes tens of seconds or minutes to perform one attenuation profile measurement. The other techniques mentioned earlier, such as sweeping laser wavelength or use optoelectronic scrambler, all require longer time.

Due to the straightforward processing methods, this proposed scheme can detect loss variation and identify loss location automatically. The system can provide the event information (e.g. large loss observed at XXX location) to the user, instead of requiring the user to analyze the data curves to check if an event occurs and to manually find the location. Comparatively, the conventional OTDR only provide the attenuation profile information, it requires the user to manually discover if an event occurs and find the location.

Same as the fiber cut detection operation, the vibration along the fiber will not affect the characteristics of the power profile result obtained in this scheme. Therefore the fiber loss detection scheme is robust and won't be affected by movements along the fiber.

Therefore, our inventive method according to the present disclosure is proven to be an effective solution to detect the fiber loss automatically and quickly. It has minimal disruption to the vibration sensing process, since it only take up much less than 1 second of sensing time, which can usually be ignored. It can be used with vibration sensing in an alternating fashion (interleaved), therefore both vibration detection and loss monitoring (as well as end point monitoring) can virtually be performed concurrently.

As compared to conventional OTDR, this scheme can perform the main function of C-OTDR, which is vibration sensing. Also, it can produce the end point information and loss information automatically. Compared to modified C-OTDR, such as adding wavelength sweeping laser or scrambler, this scheme does not require any additional hardware or any hardware modification, and therefore requires no additional cost, space, or control complexity. Therefore it is an efficient and cost effective solution to add the loss detection function to the C-OTDR.

Advantageously, our inventive method according to the present disclosure can be applied in common fiber optic network operation.

Figure 8:
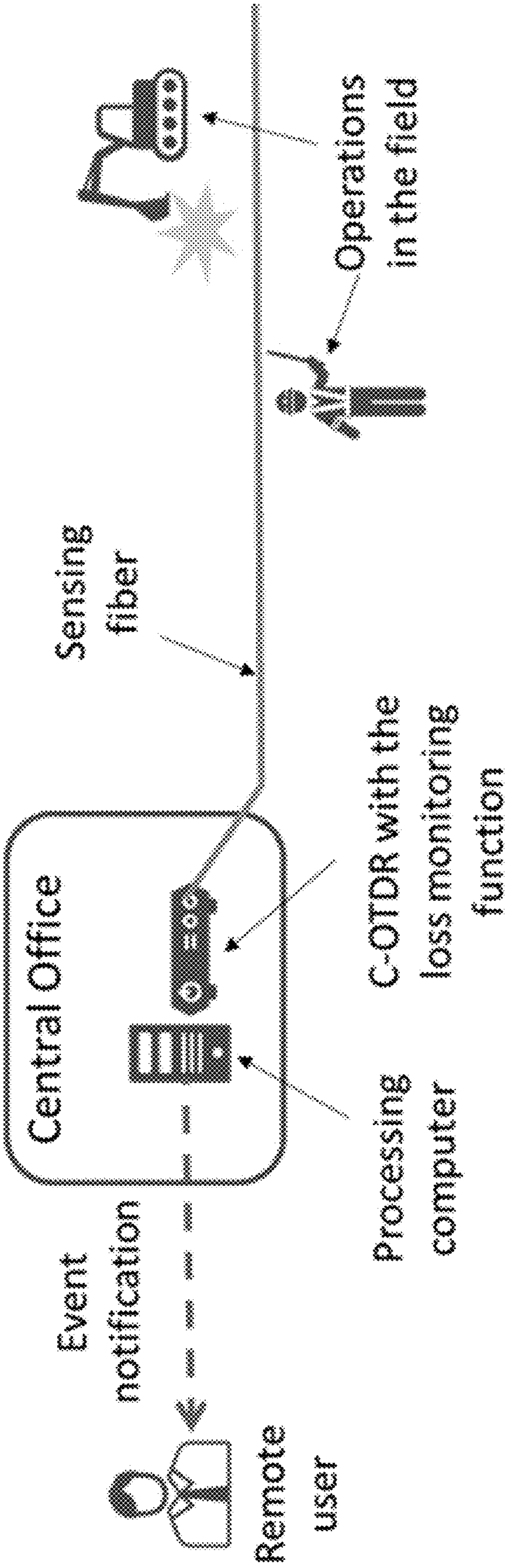
FIG. 8 is a schematic diagram showing an operation example of the fiber loss detection using C-OTDR according to aspects of the present disclosure.

FIG. 8 is a schematic diagram showing an operation example of the fiber loss detection using C-OTDR according to aspects of the present disclosure. The C-OTDR with the new loss detection function is located at the central office of the network operator. It monitors the vibration, end point, and the loss condition on the sensing fiber continuously. If there's an improper operation in the field which leads to large loss at a certain location, the C-OTDR and the attached processing computer will detect it and identify the location using the technology proposed in this invention. The fiber loss event and the location information can be sent to the remote user automatically. At the same time, the C-OTDR will perform vibration sensing and record the vibration data history for this location. This vibration history information can help to identify the cause for the loss change event. This finding is also sent to the user to take appropriate action to prevent the situation from getting worse (such as the fiber is completely cut)

Finally, FIG. 9 is a comparison of various schemes comparing the operations of the present disclosure with other known methods according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A method of providing automatic fiber loss detection using coherent optical time domain reflectometry (C-OTDR), the method comprising:

providing the C-OTDR system including
- a length of an optical sensor fiber;
- a C-OTDR interrogator in optical communication with the length of the optical sensor fiber, the C-OTDR interrogator configured to generate optical pulses, introduce the generated pulses into the length of the optical sensor fiber and receive backscattered signals from the length of the optical sensor fiber;
- an intelligent analyzer configured to analyze the backscattered signals received by the C-OTDR interrogator and further configured to provide operational functions selected from the group consisting of: determining vibrational activity at a point along the length of the optical sensor fiber, and determining an end point and loss of the length of the optical sensor fiber;
- operating the C-OTDR system and determining the vibrational activity at points along the length of the optical sensor fiber or determining the endpoint and loss of the length of the optical sensor fiber as selectively configured by a user of the C-OTDR system;
- calculating a current power profile from the backscattered signals by bypassing a high pass filter function of the C-OTDR system;
- calculating a current de-noised power profile from the current power profile using moving averaging in a spatial domain;
- comparing the current de-noised power profile with a previously saved de-noised power profile to determine a ratio for each location along the length of the optical sensor fiber; and
- identifying a fiber loss event if the ratio exceeds a pre-set threshold.

2. The method of claim 1 further comprising digitizing the backscattered signals and then serializing the digitized signals into a separate time series for each location along the length of the optical sensor fiber.

3. The method of claim 2 further comprising selectively configuring the C-OTDR system, by the user, to determine vibrational activity at points along the length of the optical sensor fiber.

4. The method of claim 3 further comprising determining the vibration activity at each location along the length of the optical sensor fiber from the separate time series for each location.

5. The method of claim 3 further comprising selectively configuring the C-OTDR system, by the user, to operate to determine the end point of the optical sensor fiber.

6. The method of claim 5 further comprising determining a power level at each location along the length of the optical sensor fiber from the separate time series for each location.

7. The method of claim 6 further comprising determining a power profile for the entire length of the optical sensor fiber by combining the determined power level of all locations.

8. The method of claim 7 further comprising determining a no-fiber signal level from the end of the fiber and setting a threshold value corresponding to that no-fiber signal level.

9. The method of claim 8 further comprising determining a location along the fiber where a signal level is above the set threshold and identifying that determined location as an end point.

10. The method of claim 1, further comprising calculating an event location of the fiber loss event based on a starting point of a rising edge in the determined ratio.

* * * * *